United States Patent [19]

Mastrocola et al.

[11] Patent Number: 4,951,283
[45] Date of Patent: Aug. 21, 1990

[54] METHOD AND APPARATUS FOR IDENTIFYING DEFECTIVE BUS DEVICES

[75] Inventors: Aldo Mastrocola, Everett; Mark Swanson, Arlington, both of Mass.

[73] Assignee: GenRad, Inc., Concord, Mass.

[21] Appl. No.: 216,917

[22] Filed: Jul. 8, 1988

[51] Int. Cl.$^5$ ............................................. G06F 11/00
[52] U.S. Cl. ................................................ 371/29.5
[58] Field of Search .................. 371/15, 20, 28, 73 R, 371/73 AT, 73 PC, 29.5, 15.1

[56] References Cited

U.S. PATENT DOCUMENTS 4,514,845  4/1985  Starr ...................................... 371/15
4,713,607  12/1987  Pepper ............................ 324/73 PC Primary Examiner—Jerry Smith
Assistant Examiner—Robert W. Beausoliel
Attorney, Agent, or Firm—Nutter, McClennen & Fish

[57] ABSTRACT

A technique for automatically diagnosing the failure of electronic devices connected to share a common bus. All bus devices are first disabled, and the bus is examined to determine if a failed device is interfering with normal operation by causing the bus to be stuck at a logic high or a logic low level. If the bus is stuck low or high, a forcing voltage nearly equal to either $V_{ol}$ or $V_{oh}$, respectively, is applied to the bus, with all devices still disabled. A disabled bus current is then measured. One at a time, the bus devices are enabled, and the current on the bus measured to determine an enabled bus current. If, for a particular device, the enabled bus current exceeds the disabled bus current by a predetermined amount depending on the drive current specification of the device, it is concluded that the particular device is operating properly.

13 Claims, 3 Drawing Sheets

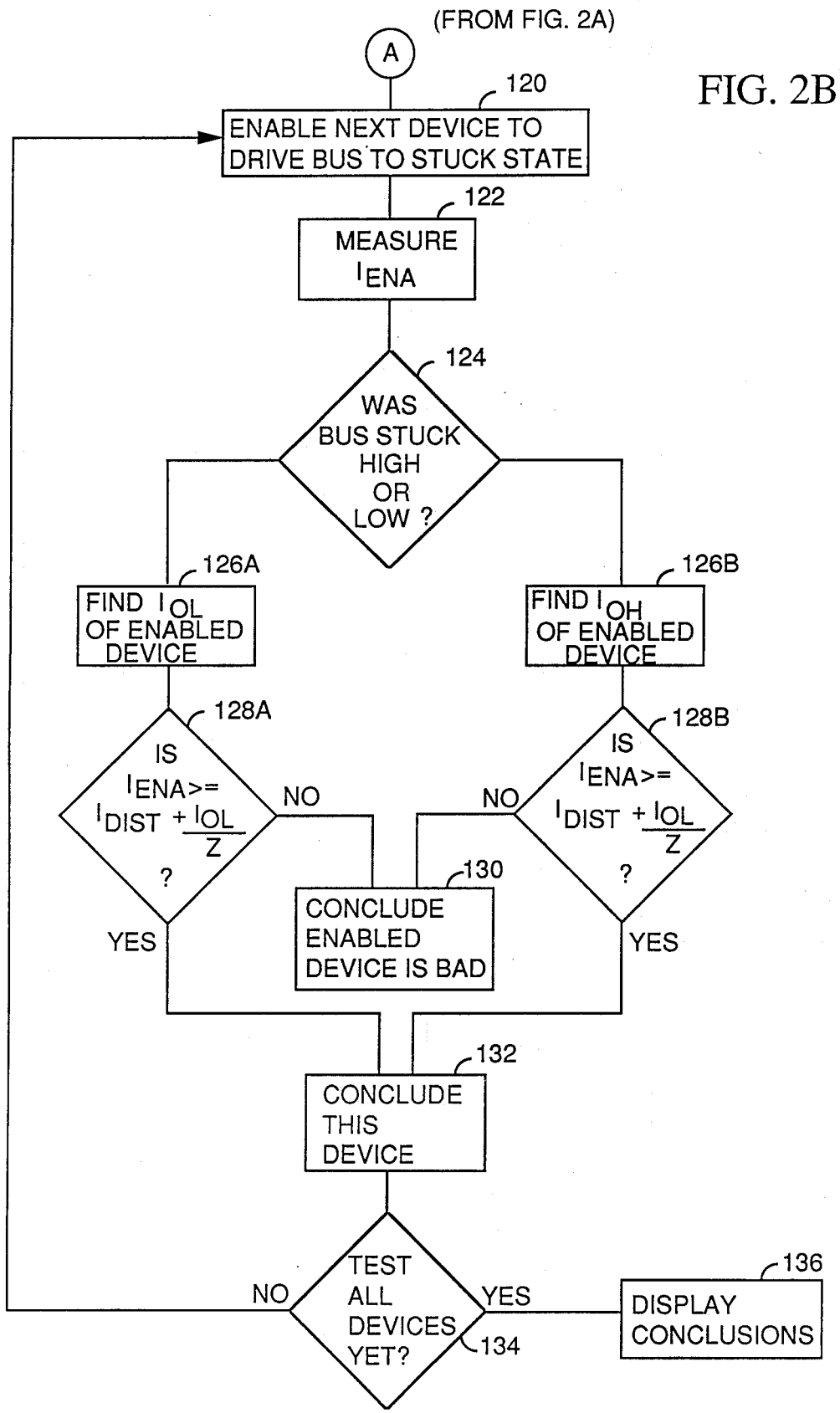

METHOD AND APPARATUS FOR IDENTIFYING DEFECTIVE BUS DEVICES

FIELD OF THE INVENTION

This invention relates generally to the field of electronic testing, and particularly to an in-circuit test technique for identifying defective logic devices connected to a bus.

BACKGROUND OF THE INVENTION

Automatic test equipment performs many of the manufacturing and diagnostic tests which previously had to be completed by tedious manual testing procedures, as well as tests which are otherwise impossible, such as dynamic realtime tests. Such automatic test equipment (called "a tester" for short) is also particularly useful for performing in-circuit device or sub-assembly testing. For example, in-circuit testing is the testing normally performed after several devices have been electrically connected together in a circuit, such as by soldering them to a printed circuit board.

A popular circuit design technique is to connect the output terminals of several circuit devices to a common node, or bus. Since only one device can be enabled at a given time with this arrangement, the devices must have an output stage which not only can assert the normal logic-high or logic-low signals but which can also be disabled. The disabled condition places the outputs of the devices in a high-impedance state. Two types of logic devices having these properties are the so-called open-collector devices and three-state devices.

Proper in-circuit automatic testing of a given bus-connected device thus requires all other devices on the same bus to be placed in the disabled state. This frees the bus so that the given device's asserted output can be observed. However, even though the given device may not be driving its output to assert a particular logic level, the bus may still be at an asserted logic level because some other, defective device drives the bus. In other words, the effect of the defective device may be to make it impossible to free the bus to the inactive state, and thus the bus is said to be "stuck" at a particular asserted logic level.

One method to test a bus to determine which, if any, device is keeping it stuck is shown in U.S. Pat. No. 4,459,693 issued to Prang et al. on July 10, 1984, and assigned to GenRad Corporation, the assignee of this invention. According to that method the bus is first tested by applying, to all bus devices, signals that will disable their output terminals connected to the bus if the devices are operating properly. If the result is that the bus assumes a non-asserted state, then normal in-circuit testing of each device can proceed. On the other hand, if the bus assumes an asserted state, further steps must be taken to determine if a defective bus device is keeping the bus stuck. Specifically, a so-called back-driving voltage source is used to drive the bus with enough current to bring the bus back to an unasserted level. The resulting bus current is then measured. The tester then continues with a diagnosis of the bus condition. This proceeds by enabling a selected device and re-measuring the bus current. If, by enabling the selected device, the bus current is changed, the tester concludes that the selected device is operating properly. If the current has not changed, then the selected device was actually enabled before the diagnosis began. The selected device is thus probably the one causing the bus to be stuck.

Although the Prang et al. method is quite advantageous it can give ambiguous or erroneous results in certain cases. For example, the current that the defective device draws may change between the first and second current measurements. This can be due to input signal changes, noise, unpredictable behavior of faulty circuits, and other reasons. It is therefore necessary to require a certain minimum threshold current change before pronouncing a device operational, or else the tester could erroneously conclude that a defective device is operational.

However, this minimum threshold current approach is also not without its problems. Because different bus devices have different output current capabilities, one device's current drift may be greater than the total current output that another device provides. This can result in an erroneous indication that a device is operating properly. Consider also the situation where the stuck device is one which can drive a lot of current, and the device to be activated can only drive a relatively small amount of current. Because the activated device only adds a small amount of current when enabled, there may be an erroneous conclusion that it is defective.

In another instance a smaller current-handling device may tend to heat up faster than other high-current devices. So, after a test sequence has been occurring for a while, the relatively hotter low-current device may draw proportionally more current than it did originally. This change in current capability with time can make it difficult to set absolute criteria for testing certain devices.

For these and other reasons, some bus devices are hard to test with a strict application of the Prang et al. method.

SUMMARY OF THE INVENTION

It is among the objects of this invention to improve the accuracy of in-circuit testing of devices connected to a bus.

According to the invention, a tester proceeds first in the conventional manner to test the bus to determine whether it is stuck. However, the tester then diagnoses the stuck bus by driving the bus with a forcing voltage very near the voltage at which the bus is stuck, rather than with an opposite logic-level back-driving voltage. Preferably, the forcing voltage depends on the published specifications for the devices connected to the bus.

For example, if the bus is stuck low, the forcing voltage is selected to be equal to or a little greater than the maximum normal logic-high level output voltage ($V_{ol}$) of the devices connected to the bus. The tester applies this forcing voltage to the bus and measures a resulting disabled-device current. The devices on the bus are then exercised by enabling them, one at a time, to drive the bus to the logic-low stuck-at state, with the forcing voltage still applied to the bus. This supplied current is then re-measured to obtain an enabled-device current for each device. If, for a given device, this enabled-device current is greater than the disabled-device current by a predetermined threshold amount, it can be concluded that the given device is operating properly.

If the bus was originally stuck high, the forcing voltage is selected to be the minimum normal logic-high level output voltage ($V_{oh}$) of the bus devices, and the same procedure is followed.

The predetermined threshold amount is ideally set to a fraction of the specified normal logic-low level output current, $I_{ol}$, if the bus is stuck low, or logic-high level output current $I_{oh}$, if the bus is stuck high.

A small increment can be added, if the bus is stuck low, or subtracted, if the bus is stuck high, to or from the forcing voltage for greater accuracy.

There are several advantages to this approach. First, it avoids inducing large back-driving voltage differences, and hence high currents, on the bus. Because the selected forcing voltage is always near the asserted logic level voltage, the range of possible bus currents is smaller, and thus the accuracy of the in-circuit test with devices of varying current capability is enhanced.

Because less current is forced onto the bus, so the devices are less apt to heat up quickly or over-heat, which results in a more reliable test.

Also, the bus is not particularly stressed since the voltages forced are very near the specifications of the device connected to the bus.

By using a fraction of the normal output current, $I_{ol}$ or $I_{oh}$, as the threshold instead of the whole expected amount, leakage current, temperature variations, and other possible errors in measurement are compensated for.

If the small increment voltage is added to or subtracted from the forcing voltage, a more reliable result occurs, since the enabled device will conduct current in the proper direction.

BRIEF DESCRIPTION OF THE DRAWINGS

This invention is pointed out with particularity in the appended claims. The above and further objects and advantages of the invention may be better understood by referring to the following description in conjunction with the accompanying drawings, in which:

FIGS. 2A and 2B are a flowchart of a testing procedure in accordance with the invention.

DETAILED DESCRIPTION OF AN ILLUSTRATIVE EMBODIMENT

Figure 1:
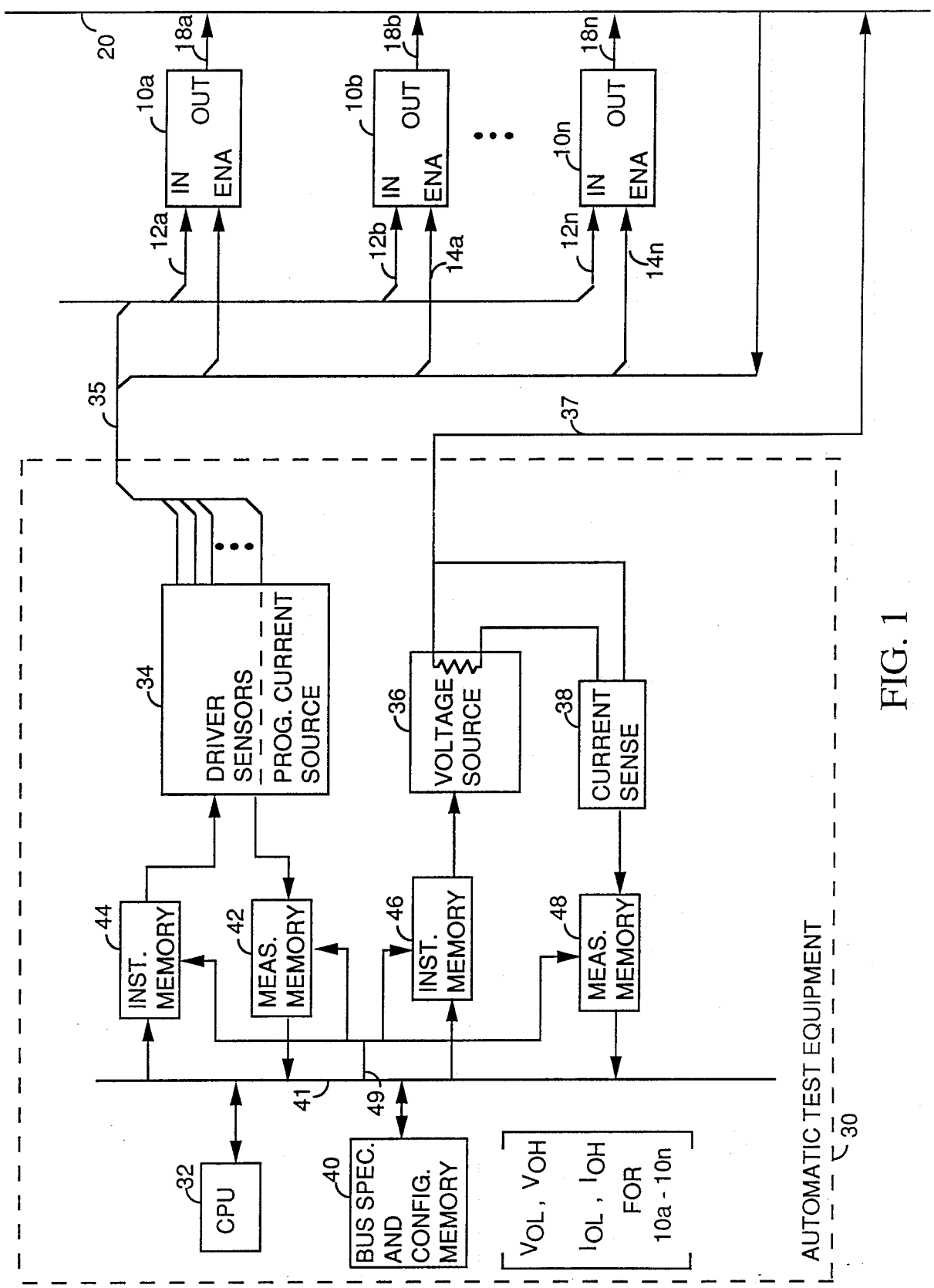
FIG. 1 depicts a block diagram of a bus testing system constructed in accordance with the invention.

FIG. 1 depicts a plurality of electronic logic circuit devices 10a, 10b, . . . , 10n, having at least some of their output terminals 18a, 18b, . . . , 18n, respectively, interconnected by a common bus 20. Devices 10a, 10b, . . . , 10n also have respective logic input terminals 12a, 12b, . . . , 12n and enable input terminals 14a, 14b, . . . , 14n. Automatic test equipment (or simply "a tester") 30 is connected to perform tests on the devices 10a, 10b, . . . , 10n and the bus 20. When performing tests in accordance with this invention, tester 30 operates to determine whether bus 20 is stuck at an asserted logic level, and, if so, which of the devices 10a, 10b, . . . , 10n is responsible.

More particularly, one of the output terminals 18a, 18b, . . , 18n may be "stuck"—that is, it may assert a logic state on the bus 20 even when signals are applied to its input terminals that should disable it. By sending test signals over test lines 35 and 37 and detecting the resulting voltages and currents, the tester 30 can determine which, if any, of the bus devices are causing this stuck condition. According to the present invention, the tester 30 backdrives the bus 20 with a voltage that differs only minimally from a measured stuck-at voltage, to produce a predictable current.

In the following discussion, the devices 10a, 10b, . . . , 10n, their respective logic input terminals 12a, 12b, . . . , 12n, enable input terminals 14a, 14b, . . . , 14n, and output terminals 18a, 18b, . . . , and 18n will be collectively referred to as simply the devices 10, logic inputs 12, enable inputs 14 and outputs 18. And, although each of the logic inputs 14 and outputs 18 are drawn as a single line, it is understood by those of skill in the art that these normally comprise several parallel terminals in most applications. Accordingly, the bus 20 is normally said to be several bits wide.

An exemplary device 10a performs logic operations in response to one or more logic signals provided at its input 12a. The state of a signal fed to the enable input 14a determines whether the output 18a will be enabled or disabled. If it is enabled, the result of these operations appears as an asserted logic level at the output 18a. If it is disabled, output 18a presents a high impedance to the bus 20. Different types of devices 10a are well known in the art, but the typical digital circuits most often used are the ones having so-called three-state or open-collector outputs.

The tester 30 performs tests and diagnosis in accordance with the present invention, and may be of conventional architecture. The illustrated tester 30 includes digital driver/sensor circuits 34, which are connected to the bus 20 and the device inputs 12 and 14. Driver/sensors 34 apply digital signals to the devices 10 and monitor the resultant signals on the bus 20 to determine whether they fall in one, the other, or neither of the logic-level ranges. During diagnosis, the tester 30 also employs an analog voltage source 36 to apply a programmed voltage level to the bus 20. A current sensor 38 is used, as will be explained in more detail below, to measure the resultant source current.

More particularly now, the single block 34 represents a plurality of driver/sensors. Each driver/sensor 34, known in the art, is capable of operating as a digital signal source or logic-level sensor. The driver/sensors 34 are thus organized into driver/sensor pairs, in which the driver output node and the sensor input node occupy the same physical output terminal. Such organization is not necessary to the practice of this invention, but is assumed for the remainder of the discussion of the preferred embodiment.

In the driver mode, driver/sensors 34 apply test inputs by way of digital test lines 35. Thus, one driver/sensor 34 is connected to the logic input 12a of device 10a, one to its enable input 14a, and so forth for each device 10 to provide test logic signals to those input terminals. Another driver/sensor 34, operating in the sensor mode, is connected to the bus 20 to provide a way for CPU 32 to detect its unasserted or asserted logic state. In the driver mode at least some of the driver/sensors 34 include a programmable current source having a high impedance. Thus, in the conventional manner, by attempting to sink or drive a fairly small current and detecting the resulting logic level, such a driver/sensor 34 can determine if the bus 20 is free, and if not, at which asserted level it is stuck.

During the diagnosis of the stuck condition of the bus 20, the voltage source 36 forces a regulated analog voltage on the bus 20 over the analog test signal line 37. The regulated forced voltage is chosen depending upon the specifications of the devices connected to the bus 20, as will be seen shortly. The current sensor 38 is arranged to monitor the current supplied by the voltage source 36 to the bus 20. This is preferably accomplished by monitoring the voltage drop across a precision resistor 39 in the output stage of the voltage source 36.

A central processing unit (CPU) 32 determines which logic and voltage levels the driver/sensors 34 and voltage source 36 are to apply. It also receives measurements from the driver/sensors 34 and the current source 38, and in response determines whether the bus 20 is stuck and, if so, which, if any, devices are responsible.

In a typical tester architecture, certain components of tester 30 including the driver/sensors 34, voltage source 36, and current sensor 36 operate at rates faster then that which the CPU 32 can communicate and receive results. For this reason, high-speed measurement and instruction memories 42 and 44 are interposed between the CPU 32 and the driver/sensors 34. By way of a tester bus 41, the CPU 32 loads instructions into the instruction memory 44 at a relatively low speed, and then causes them to be applied at a higher rate to the drivers/sensors 34 by way of a trigger input 49. The results from the driver/sensors 34 are loaded into the measurement memory 42 at the higher rate for later collecting by the CPU 32 at its leisure. Similar memories 46 and 48 perform analogous functions for the voltage source 36 and current sensor 38.

In addition to these high-speed memories, the tester 30 also includes a lower-speed specification and configuration memory 40, which, in addition to the information usually retained by a typical tester memory, also includes various parameters used to determine the levels and voltages applied to the driver/sensors 34 and the voltage source 36.

The particular voltage supplied by the voltage source 36 depends upon the manufacturer's output voltage and current specifications for the particular devices 10 which are connected to the bus 20. If, for example, the devices 10 are standard transistor-transistor logic (TTL) compatible devices, the memory 40 has prestored at least the following parameters for each of the devices 10:

$V_{oh}$, the high-level output voltage, is the minimum voltage at an output terminal with input conditions applied that establish a logic high-level at the output; and $V_{ol}$, the low-level output voltage, is the minimum voltage at an output terminal with input conditions applied that establish a logic low-level at the output;

$I_{ol}$, the low-level output current, is the current into an output terminal with input conditions applied that establish a logic low-level at the output; and $I_{oh}$, the high level output current, is the current into an output terminal with input conditions applied that establish a logic high-level at the output.

The CPU 32 uses these specifications to arrive at a forcing voltage, as will be seen shortly.

The memory 40 also contains information as to the functional type of each of the devices 10, so that signals may be applied to their inputs 12 to cause a particular logic level to be asserted at their outputs 18 when the devices 10 are operating properly.

Figure 2A:
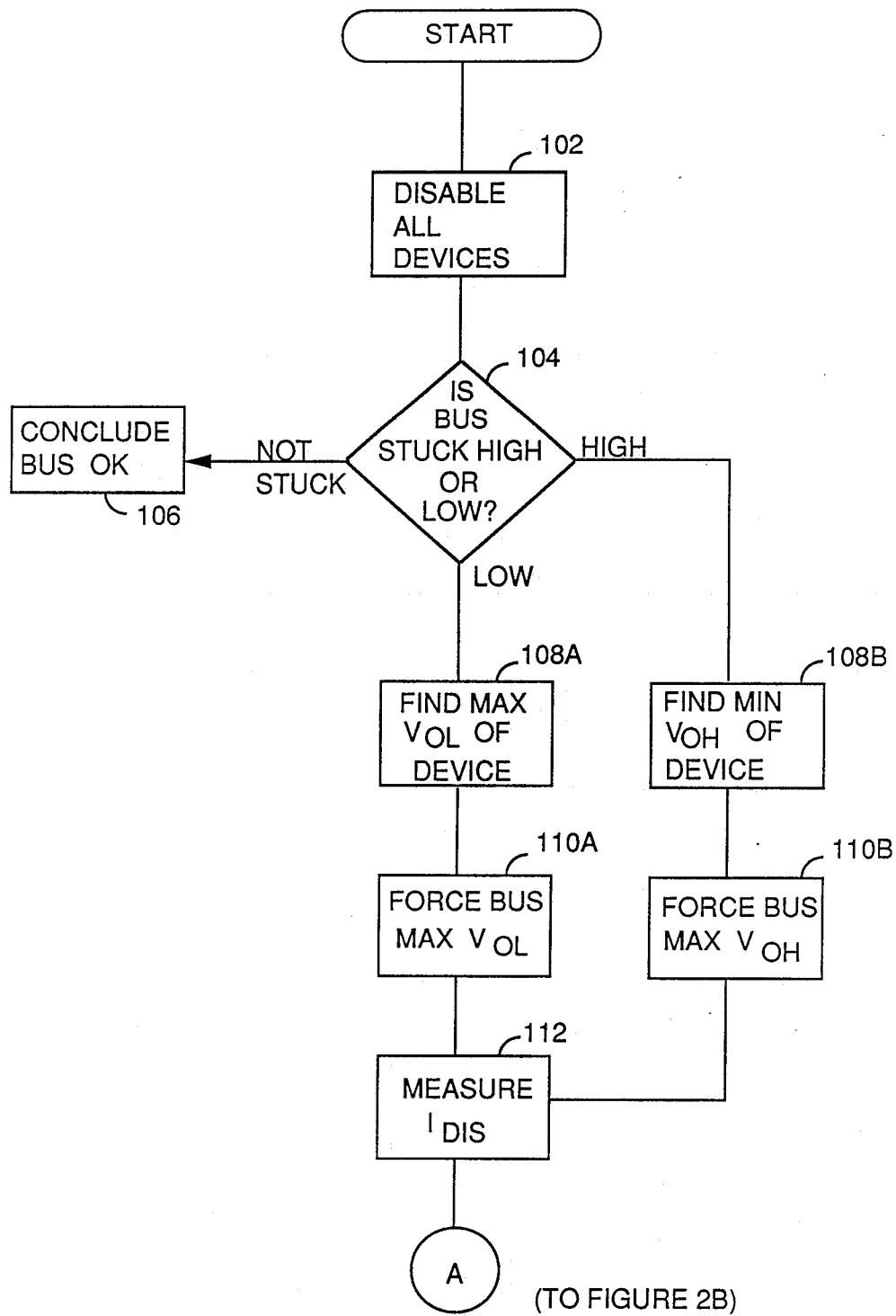

The essence of this invention thus lies in the sequence of logic levels and voltages sent over the digital test lines 35 and analog test lines 37 in the operations of the tester 30. FIGS. 2A and 2B depict these operations as a flow chart. In step 102 of FIG. 2A, the driver/sensors 34 apply signals to the enable inputs 14 of all the devices 10 so that their outputs 18 will be disabled if the devices 10 are not stuck in an asserted state. At the same time, the voltage source 36 is also set to provide a non-asserted voltage at a high impedance. Next, in step 104, a driver/sensor 34 senses the logic level of the bus 20 to determine if the bus 20 is in a disabled, high-impedance state. If it is, it can be concluded that the bus 20 is not stuck, and testing of the logical operation of the individual devices 10 can proceed, as represented by step 106.

For most present-day bus arrangements, where three-state bus devices drive or draw current to assert one of the two logic levels, the bus 20 can be stuck at either logic level. In such arrangements, the non-asserted voltage level applied by the voltage source 36 during this part of the test is a value between the voltage ranges recognized as signifying the asserted logic levels. For example, if logic zero is defined to be any voltage below 0.4 volts and logic one is defined to any voltage above 2.4 volts, then the voltage source 36 may apply a voltage such as 1.7 volts. If all bus devices are, in fact, disabled, then the non-asserted level of 1.7 volts will be the bus voltage. Because of the high impedance that voltage source 36 presents for this part of the test, though, a stuck device 10 will be able to drive the bus 20 to one of the asserted logic levels. One of the driver/sensors 34 detects this level and informs the CPU 32 that the bus 20 is stuck.

Although we have described the non-asserted level that the voltage source 36 applies as being outside of both logic-level ranges, it should be recognized that such an arrangement is not necessary used in all bus designs. In some older bus configurations, for instance, the bus devices 10 are not three-state devices, but rather open-collector devices, which have output stages that operate in only two states. In the first, logic-one state, they draw no current, and the bus, which is tied through a load to logic-one voltage source, remains at a logic-one voltage. In the other, logic-zero state, they draw current through the load (or device current into it) to cause the bus to assume the logic-zero voltage. In this arrangement, one of the logic levels, namely, logic one, is itself the non-asserted level. To test a bus 20 connected with such devices, therefore, source 36 can apply a logic-one level through a high impedance, and the tester 30 performs the step of testing for a non-asserted bus level by determining whether the bus voltage is in the non-asserted, or logic-one range. If the bus voltage is in that range, the bus is not stuck. If it is in the asserted, logic-zero range, then it is stuck.

Returning now to the discussion of FIG. 2A and step 104, if the bus is not disabled, that is, if it has an asserted logic level, the stuck-at asserted level is examined. If the bus is at a logic-low level or a logic high-level, control passes to step 108a or step 108b, respectively. In step 108a the CPU 32 finds the maximum $V_{ol}$ of the devices 10 connected to the bus 20 by searching the contents of the bus configuration and specification memory 40. The voltage source 36 then forces this maximum $V_{ol}$ onto the bus in step 110a. If the step 108b path is taken, the CPU 32 finds the minimum $V_{oh}$ of the devices 10, and in turn, this minimum $V_{oh}$ is forced onto the bus in step 110b. In either event, the tester 30 next executes step 112 where current sensor 38 measures the resulting disabled-bus current, $I_{dis}$, and sends this measurement to the CPU 32.

Continuing with FIG. 2B and step 120, the driver/sensors 34 then apply to the devices 10, one at a time, signals that should cause their outputs 18 to drive the bus 20 to the stuck-at logic level. The voltage source 36 continues to apply the forcing voltage to the bus 20 during this process. Current sensor 38 then measures a resulting enabled-bus current, $I_{ena}$, for each device 10, as step 122 indicates.

The CPU 32 then performs steps 124 through 132, where it compares the disabled-device current $I_{dis}$ with the enabled-device current $I_{ena}$ for each device to determine whether that device is malfunctioning. Specifically, the enabled-device current $I_{ena}$ for a particular device 10 will be greater than the disabled-device current $I_{dis}$ if the particular device 10 is operational, since the particular device 10 adds current when enabled. Because of noise and device-specification tolerance, however, it is desirable to use a threshold in this comparison process. The preferred threshold depends on the drive current specifications, $I_{ol}$ and $I_{oh}$, of the particular device 10. If the bus 20 was stuck at the logic-low level in the initial test of step 104, then the voltage source 36 forces the maximum $V_{ol}$ on the bus, and the current added by the particular device is on the order of its $I_{ol}$. To allow for leakage current, temperature variations, and measurement errors, it has been found that a good threshold to use is thus one-half the $I_{ol}$ of the particular device. Thus, the preferred test to determine if the particular device 10 is operational is to se if $$I_{ena} \geq I_{dis} + \tfrac{1}{2} I_{ol}$$

If this condition is met, the tester 30 can conclude that the particular device is operational; otherwise, that the particular device is defective. Blocks 128a, 130, and 132 depict this operation. If the bus 20 is stuck at the logic-high level, the tester performs a similar operation with $I_{oh}$ substituted for $I_{ol}$, as blocks 128b, 130, and 132 indicate.

Blocks 134 and 120 indicate that the CPU 32 repeats the sequence of FIG. 2B until it has tested all devices 10. It then displays a list of "indicated" devices, as block 136 shows, which are the suspected faulty ones.

Unlike prior approaches, the present invention does not back-drive a device output all the way to a logic-level opposite the stuck-at logic level. Rather, the voltage source 36 drives either to the maximum $V_{ol}$, if the bus 20 is stuck low, or to the minimum $V_{oh}$, if the bus 20 is stuck high. Thus, the applied voltage is only slightly higher or lower than the stuck-at voltage.

It has also been found that the test can be made even more reliable by insuring that the enabled device will conduct current in the proper direction. This is done by adding a small incremental voltage $\delta$ to $V_{ol}$ or subtracting it from $V_{oh}$, and using the result as the forcing voltage. For TTL devices, a $\delta$ in the range of 100 to 200 mv has been found to increase noise immunity in comparison with using $V_{ol}$ or $V_{oh}$ alone.

If more that one device is concluded to be faulty in step 130, it has been found advantageous to order the probability of device 10 faults with the device 10 which drove the least current onto the bus as the most probable defective device. Additional testing can then take place, such replacing suspected devices in order of fault probability, and retesting of the bus 20.

Several advantages result from this approach. One is that the bus devices are not particularly stressed, since the voltages forced by the voltage source 36 are nearly within the normal operating specifications of the devices 10 connected to the bus 20. Another advantage is that since the devices dissipate less heat, their operating points are steadier, so the current drawn by the stuck device does not change as much between tests. This is important for the individual tests of devices whose $I_{ol}$ and $I_{oh}$ are small, since such devices cannot be reliably tested if the current change in the stuck device was on the order of their $I_{ol}$'s and $I_{oh}$'s.

The foregoing description has been limited to a specific embodiment of this invention. It will be apparent, however, that variations and modifications may be made to the invention, some of which have been explicitly mentioned, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. Apparatus for diagnosing which of a plurality of electronic devices having output terminals connected to a common bus node has failed, comprising:
   A. enabling means, coupled to input terminals of the devices, for selectively enabling or disabling output terminals of the devices connected to the bus, such that the device output terminals would be enabled or disabled if the devices were operating properly;
   B. sensing means for sensing if the bus is stuck-at an asserted logic level when the enabling means disables the device output terminals of all devices connected to the bus;
   C. forcing voltage means for applying a forcing voltage to the bus, the forcing voltage being a voltage closer to the asserted logic level than to the logic level opposite the asserted level;
   D. disabled-bus current means for measuring a disabled-bus current sunk or sourced onto the bus by the forcing voltage means when all other devices connected to the bus are disabled by the enabling means;
   E. driving means, for driving the logic inputs of a selected one of the devices so that the selected device would drive its output terminal to the stuck-at asserted logic level if it were operating properly;
   F. enabled-bus current means, for measuring an enabled-bus current sunk or sourced onto the bus by the forcing means when the selected one of the devices connected to the bus is enable by the enabling means, and all other devices connected to the bus are disabled; and
   G. determining means, responsive to the disabled-bus current means and the enabled-bus current means, for determining if the selected device is operational, and for generating an indication that the selected device is not operational if the enabled-bus current and disabled-bus current differ by less than a predetermined minimum difference amount.

2. An apparatus as in claim 1 wherein the determining means uses a predetermined minimum difference value proportional to a low-level-output-specification current of the selected device if the testing of the bus indicated stuck at a logic-low voltage, and otherwise proportional to a high-level-output-specification current.

3. An apparatus as in claim 2 wherein the difference value is set to one-half the low-level-output-specification current of the selected device if the testing of the bus indicated stuck at a logic-low voltage, and otherwise set to one-half the high-level-output-specification current.

4. An apparatus as in claim 1 wherein the devices each have a maximum-normal-logic-low and a minimum-normal-logic-high voltage specification, and the forcing voltage means provides a forcing voltage equal to a highest maximum-normal-output-logic-low voltage of the devices connected to the bus if the bus is stuck at a logic-low voltage, and the forcing voltage equal to a lowest minimum-normal-output-logic-high voltage of the devices on the bus if the bus is stuck at a logic-high voltage.

5. An apparatus as in claim 4 wherein the forcing voltage means provides a forcing voltage equal to a highest maximum-normal-output-logic-low voltage plus a predetermined offset voltage if the bus is stuck at the logic-low voltage, and a forcing voltage equal to a minimum-normal-output-logic-high voltage minus a predetermined offset voltage if the bus is stuck at the logic-high voltage.

6. An apparatus as in claim 5 wherein the offset voltage is the range of 100 to 200 millivolts.

7. A method for diagnosing which of a plurality of electronic devices having their output terminals connected to a common bus node has failed, comprising the steps of:
  A. applying to the devices signals that will disable their output terminals if the devices are operating properly;
  B. testing the bus to determine if it is stuck at an asserted voltage while the disable signals are applied to all the devices on the bus;
  C. if the bus is stuck, performing a bus diagnosis by:
    i. applying a forcing voltage to the bus, the forcing voltage being closer to the voltage level at which the bus is stuck than to the opposite of the stuck-at voltage level;
    ii. measuring the bus current occurring while the forcing voltage is applied to the bus, thereby providing a disabled-bus current value;
    iii. applying control signals to the devices which will enable an output terminal of a selected device and disable all the other devices' output terminals if the devices are operating properly;
    iv. re-measuring the bus-current occurring while the forcing voltage is applied to the bus, thereby providing an enabled-bus current value;
    v. comparing the disabled-bus current value to the enabled-bus current value; and
    vi. generating an indication that the selected device is operational if the enabled-bus current value exceeds the disabled-bus current value by a predetermined amount.

8. A method for diagnosing which of a plurality of electronic devices has failed, where each of the devices have input terminals and output terminals, with some of the input terminals being logic inputs, some of the input terminals being enable inputs, and some of the output terminals connected to a common bus node, the method comprising the steps of, in order:
  A. applying control signals to the enable inputs of the devices connected to the bus, the control signals such that the output terminals of all devices connected to the bus will be disabled if the devices are operating properly;
  B. connecting a voltage source to the bus, to apply a non-asserted voltage to the bus, the non-asserted voltage corresponding to a non-asserted logic level;
  C. sensing whether the bus is stuck at an asserted logic level while the non-asserted voltage is applied;
  D. changing the voltage applied by the voltage source, so that a forcing voltage is applied to the bus, the forcing voltage being a voltage closer to the asserted logic level than to the logic level opposite the asserted level;
  E. measuring a disabled-bus current sunk or sourced onto the bus while the forcing voltage is applied;
  F. driving the logic inputs of a selected one of the devices so that the selected device will drive its output terminal connected to the bus to the stuck-at asserted logic level if it is operating properly;
  G. re-measuring an enabled-bus current sunk or sourced onto the bus; and
  H. determining if the selected device is operational, by determining whether the enabled-bus current and disabled-bus current differ by more than a predetermined minimum difference amount.

9. The method of claim 8 wherein the determining step uses a predetermined minimum difference value proportional to a low-level-output-specification current of the selected device if the testing of the bus indicated stuck at a logic-low voltage, and otherwise proportional to a high-level-output-specification current.

10. The method of claim 8 wherein the determining step uses a difference value set to one-half the low-level-output-specification current of the selected device if the testing of the bus indicated stuck at a logic-low voltage, and otherwise set to one-half the high-level-output-specification current.

11. The method of claim 8 wherein the devices each have a maximum-normal-logic-low and a minimum-normal-logic-high voltage specification, and the forcing voltage applied is equal to a highest maximum-normal-output-logic-low voltage of the devices connected to the bus if the bus is stuck at a logic-low voltage, and the forcing voltage equal to a lowest minimum-normal-output-logic-high voltage of the devices on the bus if the bus is stuck at a logic-high voltage.

12. The method of claim 11 wherein the forcing voltage is equal to a highest maximum-normal-output-logic-low voltage plus a predetermined offset voltage if the bus is stuck at the logic-low voltage, and the forcing voltage equal to a minimum-normal-output-logic-high voltage minus a predetermined offset voltage if the bus is stuck at the logic-high voltage.

13. The method of claim 12 wherein the offset voltage is the range of 100 to 200 millivolts.

* * * * *